(12) United States Patent
Trim et al.

(10) Patent No.: US 11,501,137 B2
(45) Date of Patent: Nov. 15, 2022

(54) FEATURE ENGINEERING IN NEURAL NETWORKS OPTIMIZATION

(71) Applicant: International Business Machines Corporation, Armonk, NY (US)

(72) Inventors: Craig M. Trim, Ventura, CA (US); Mary E. Rudden, Denver, CO (US); Aaron K. Baughman, Cary, NC (US); Stefan A. G. Van Der Stockt, Austin, TX (US); Bernard Freund, Victoria (CA); Augustina Monica Ragwitz, Portland, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 810 days.

(21) Appl. No.: 16/456,076

(22) Filed: Jun. 28, 2019

(65) Prior Publication Data

US 2020/0410324 A1    Dec. 31, 2020

(51) Int. Cl.
G06F 16/90     (2019.01)
G06N 3/04      (2006.01)
(Continued)

(52) U.S. Cl.
CPC ....... *G06N 3/0472* (2013.01); *G06F 16/9024* (2019.01); *G06F 17/16* (2013.01); *G06F 17/18* (2013.01); *G06N 5/04* (2013.01)

(58) Field of Classification Search
CPC .......................... G06F 16/9024; G06F 17/16
See application file for complete search history.

(56) References Cited

U.S. PATENT DOCUMENTS 6,750,864 B1 * 6/2004 Anwar ................ G06F 16/248
                                                        345/440
10,019,438 B2   7/2018 Audhkhasi et al.
(Continued)

FOREIGN PATENT DOCUMENTS

CN    108629630 A    10/2018
WO    2018212710 A1  11/2018

OTHER PUBLICATIONS

International Searching Authority, PCT/IB2020/055523, dated Sep. 27, 2020.
(Continued)

*Primary Examiner* — Eliyah S. Harper
(74) *Attorney, Agent, or Firm* — Garg Law Firm, PLLC; Rakesh Garg; Michael O'Keefe

(57) ABSTRACT

A transitive closure data structure is constructed for a pair of features represented in a vector space corresponding to an input dataset. The data structure includes a set of entries corresponding to a set of all possible paths between a first feature in the pair and a second feature in the pair in a graph of the vector space. The data structure is reduced by removing a subset of the set of entries such that only a single entry corresponding to a single path remains in the transitive closure data structure. A feature cross is formed from a cluster of features remaining in a reduced ontology graph resulting from the reducing the transitive closure data structure. A layer is configured in a neural network to represent the feature cross, which causes the neural network to produce a prediction that is within a defined accuracy relative to the dataset.

20 Claims, 10 Drawing Sheets

(51) Int. Cl.
*G06N 5/04* (2006.01)
*G06F 17/18* (2006.01)
*G06F 17/16* (2006.01)
*G06F 16/901* (2019.01)

(56) References Cited

U.S. PATENT DOCUMENTS

| | | | | |
|---|---|---|---|---|
| 10,025,862 | B2* | 7/2018 | Gramatica | G06F 40/30 |
| 11,113,745 | B1* | 9/2021 | Cetintas | G06Q 30/0625 |
| 2005/0283680 | A1 | 12/2005 | Kobayashi et al. | |
| 2006/0271304 | A1 | 11/2006 | He et al. | |
| 2008/0098010 | A1* | 4/2008 | Ben Asher | G06F 16/2237 |
| 2014/0207746 | A1* | 7/2014 | Song | G06F 16/3322 |
| | | | | 707/706 |
| 2014/0267301 | A1* | 9/2014 | Yang | G06V 10/7625 |
| | | | | 345/467 |
| 2017/0053208 | A1* | 2/2017 | Krishnamurthy | G06N 5/022 |
| 2017/0220603 | A1* | 8/2017 | Riggs | G06F 16/2458 |
| 2017/0235846 | A1* | 8/2017 | Atlas | G06F 16/24568 |
| | | | | 707/737 |
| 2018/0300425 | A1 | 10/2018 | Azmi | |
| 2019/0050465 | A1* | 2/2019 | Khalil | G06F 16/258 |
| 2019/0050750 | A1 | 2/2019 | Le et al. | |
| 2020/0167694 | A1* | 5/2020 | Pisner | G06F 9/4881 |
| 2022/0180240 | A1* | 6/2022 | Luo | G06N 20/00 |

OTHER PUBLICATIONS

Wang et al., "Deep & Cross Network for Ad Click Predictions." (Submitted on Aug. 17, 2017) https://arxiv.org/abs/1708.05123.

Luo et al., "AutoCross: Automatic Feature Crossing for Tabular Data in Real-World Applications." (Submitted on Apr. 29, 2019) https://arxiv.org/abs/1904.12857.

Feng1122, "Principle of setting 'hash_bucket_size' parameter?", Aug. 15, 2017 https://stackoverflow.com/questions/45685301/principle-of-setting-hash-bucket-size-parameter.

Shan et al., "Deep Crossing: Web-Scale Modeling without Manually Crafted Combinatorial Features." In Proceedings of the 22nd ACM SIGKDD International Conference on Knowledge Discovery and Data Mining (KDD '16). ACM, NY, pp. 255-262, 2016.

Beutel et al., "Latent Cross: Making Use of Context in Recurrent Recommender Systems." In Proceedings of the Eleventh ACM International Conference on Web Search and Data Mining (WSDM '18). ACM, NY, pp. 46-54, 2018.

Vicient et al., Ontology-Based Feature Extraction, 2011, IEEE/WIC/ACM International Conferences on Web Intelligence and Intelligent Agent Technology.

Garla et al., "Ontology-guided feature engineering for clinical text classification." NIH.gov, 2012, https://www.ncbi.nlm.nih.gov/pubmed/22580178.

Szwabe. et al., Tensor-Based Syntactic Feature Engineering for Ontology Instance Matching. ICAISC 2017, Part II, LNAI 10246, pp. 609-622, 2017. DOI: 10.1007/978-3-319-59060-8 55.

* cited by examiner

852

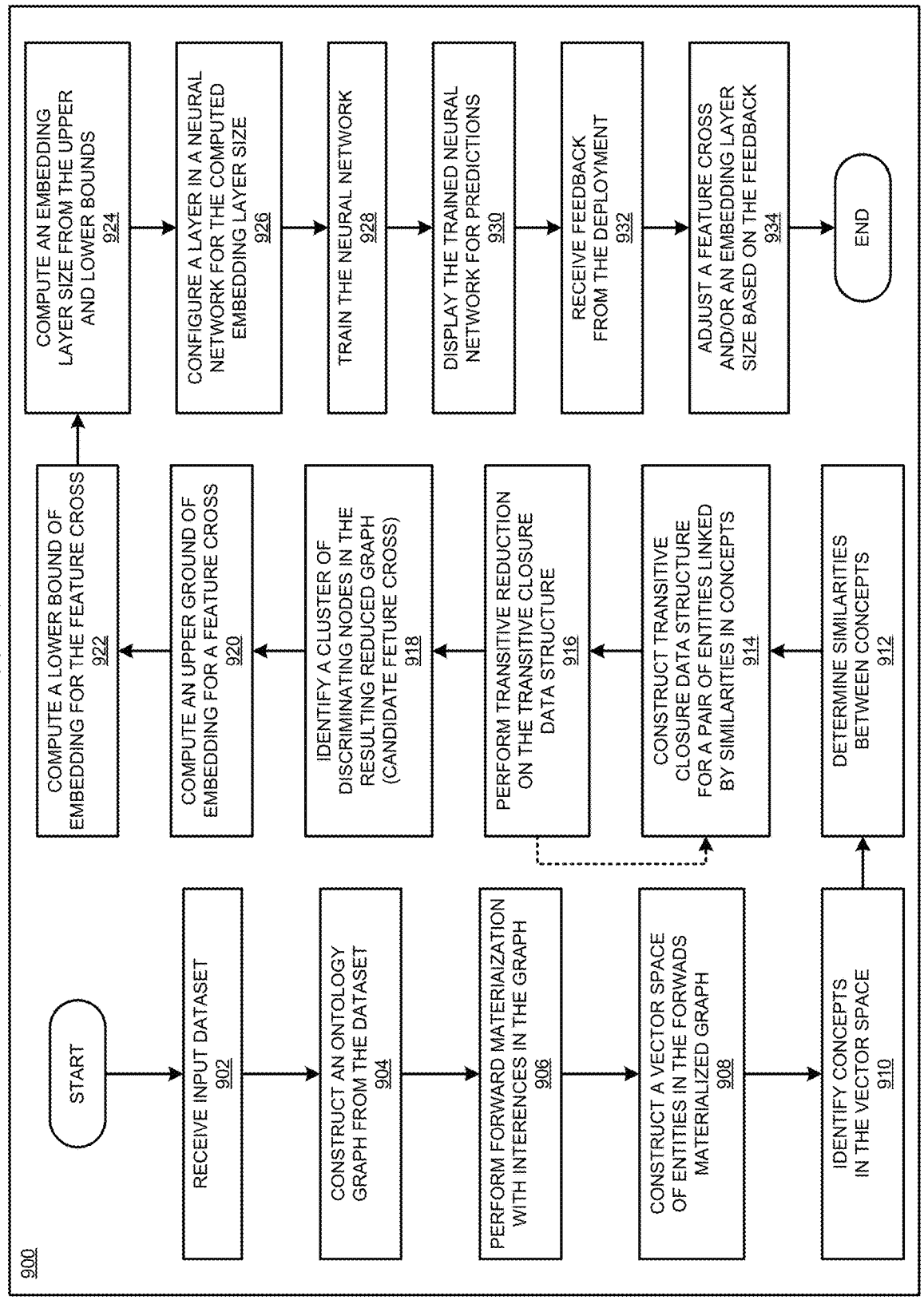

FEATURE ENGINEERING IN NEURAL NETWORKS OPTIMIZATION

TECHNICAL FIELD

The present invention relates generally to a method, system, and computer program product for configuring a neural network to produce predictions based on large datasets. More particularly, the present invention relates to a method, system, and computer program product for feature engineering in neural networks optimization.

BACKGROUND

A dataset as used herein is a collection, body, or corpus of data in which a data item corresponds to one or more features from a feature set. A feature is an entity that is represented in the data. For example, in a dataset that is a snippet from a book in English literature, distinct words can be regarded as features. As another example, in a dataset that includes traffic flow data, days of a week and hours of a day can be regarded as features.

A feature is not only an entity that is directly or manifestly represented in the data but also an entity that can be inferred from the data. For example, suppose that a dataset contains product ownership data and one data item in the dataset shows that company X owns product Y. In the dataset, X and Y are directly represented features (as are the generic classes "company" and "products"), but the fact that X also owns version 10 of product Y can also be inferred from X owning Y and Y having a version 10. Thus, "Y version 10" is also a feature that can be inferred from the dataset.

A feature cross (FC) is a combination or concatenation of two or more features. For example, using the dataset with traffic data as an example again, while 'Monday' and '2 PM' might be features in the dataset, 'Monday+2 PM' (i.e., Monday at 2 PM) is a feature cross formed from combining features 'Monday' and '2 PM. That is, a data item may correspond to 'Monday' but may or may not correspond to '2 PM'; another data item may correspond to '2 PM' but may correspond to 'Thursday' instead of 'Monday'. Only a data item that corresponds to both 'Monday' and '2 PM' would correspond to feature cross 'Monday+2 PM'.

Given a dataset as input, a neural network (NN) can be configured to make predictions based on the dataset. For example, given a dataset that is a snippet from a book in English literature, a neural network can be configured to predict whether some specific words will occur together or at some specified distance from one another. As another example, in a dataset that includes traffic flow data, a neural network can be configured to predict a volume of traffic at a certain hour on a certain day in the future.

An ontology as referred to herein is a graph representation of a dataset in which the features form the vertices and relationships between features—whether expressly present in the dataset or inferred there from—form the edges. An ontology according to the illustrative embodiments can have vertices representing features, feature crosses, or a combination thereof.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

A neural network can be configured to represent a set of features, feature crosses, or some combination thereof. The illustrative embodiments recognize that configuring a neural network such that the predictions are consistent with the dataset and an expected outcome (or an actual outcome if available) is a difficult problem for a variety of reasons. For example, a size of a neural network is related to a number of features or feature crosses on which the neural network is expected to operate.

Again, consider the traffic dataset example. There are only 7 days of a week features and 24 hours of a day features, a total of 31 features. However, not all hours of days are equally significant for prediction. E.g., one may be more interested in a traffic prediction at 8 PM on Fridays rather than at 8 PM on Mondays. However, a total of 7*24=168 feature cross is now possible with just two types of features being crossed. The illustrative embodiments recognize that a neural network that represents 31 features is substantially less complex than a neural network that is configured for 168 feature crosses.

Furthermore, the illustrative embodiments recognize that a dataset can be represented as a matrix in which the features form the columns and each data item is a row. A row gets an entry in a cell under a column if the data item of that row relates to the feature of that column. As can be seen, even the matrix with 31 columns for 7 days and 24 hours can be sparsely populated in that not every hour of every day has traffic data that might be available/useful/meaningful. A matrix of feature crosses becomes even more sparse as compared to the matrix of the features to which the feature crosses correspond. E.g., with just day+hour type of feature crosses, the revised matrix now has 168 columns instead of 31, with a row now corresponding to an even smaller percentage of cells in the matrix. A neural network configured on these 168 example feature crosses would have to hold a very sparse matrix in memory to perform the computations.

In practice, a matrix is often many thousands of columns by many thousands of rows, and a neural network has several layers with each layer including thousands of nodes. Training a neural network on a dataset causes the weights of these nodes to be computed and adjusted for bringing the output of the neural network within a desired threshold of accuracy. The adjustment of weights of a neural network is a computationally expensive process. Keeping large but sparse matrices requires undesirably large amounts of memory for the training and operation of the neural network. The illustrative embodiments recognize that while feature crossing is desirable to increase the relevance of the output of the neural network, feature crossing also causes a matrix to become sparser and increases the complexity and resource requirements of the neural network.

SUMMARY

The illustrative embodiments provide a method, system, and computer program product. An embodiment includes a method that constructs, using a processor and a memory, a transitive closure data structure for a pair of features represented in a vector space corresponding to an input dataset, wherein the transitive closure data structure comprises a set of entries corresponding to a set of paths in a graph of the vector space, the set of paths comprising all possible paths in the graph between a first feature in the pair and a second feature in the pair. The embodiment reduces the transitive closure data structure by removing from the transitive closure data structure a subset of the set of entries such that only a single entry corresponding to a single path remains in the transitive closure data structure. The embodiment forms a feature cross from a cluster of features remaining in a reduced ontology graph resulting from the reducing the transitive closure data structure. The embodiment configures a layer in a neural network to represent the feature cross, wherein the configured layer in the neural network causes the neural network to produce a prediction that is within a defined accuracy relative to the dataset.

Another embodiment further computes, using the processor and the memory, for the layer, an upper bound of layer embedding corresponding to the feature cross. The embodiment computes, for the layer, a lower bound of the layer embedding corresponding to the feature cross, wherein a layer size of the layer for layer embedding is based on the upper bound and the lower bound.

In another embodiment, the layer size is a computed average of the upper bound and the lower bound.

Another embodiment further transforms the dataset into a sparse matrix. The embodiment constructs an ontology graph corresponding to the sparse matrix, wherein the ontology graph comprises a set of vertices corresponding to a set of features in the dataset. The embodiment performs a forward materialization on a graph, wherein the forward materialization adds an inference vertex to the set of vertices, and wherein the set of vertices including the inference vertex is used in constructing the transitive closure data structure.

In another embodiment, the single remaining path satisfies an efficiency requirement.

In another embodiment, the efficiency requirement comprises a shortest distance between the first feature and the second feature.

In another embodiment, the efficiency requirement comprises a highest usage between the first feature and the second feature.

In another embodiment, the reducing comprises a transitive reduction algorithm.

In another embodiment, the reducing the transitive closure data structure causes a subset of vertices to be removed from the ontology graph, forming the reduced ontology graph.

Another embodiment further identifies a plurality of clusters in the reduced ontology graph, the plurality of clusters including the cluster, and wherein the cluster comprises at least two features such that a combination of the two features is usable to distinguish between at least a first portion of the dataset and a second portion of the dataset.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 9 depicts a flowchart of an example process for feature engineering in neural networks optimization in accordance with an illustrative embodiment.

DETAILED DESCRIPTION

Figure 1:
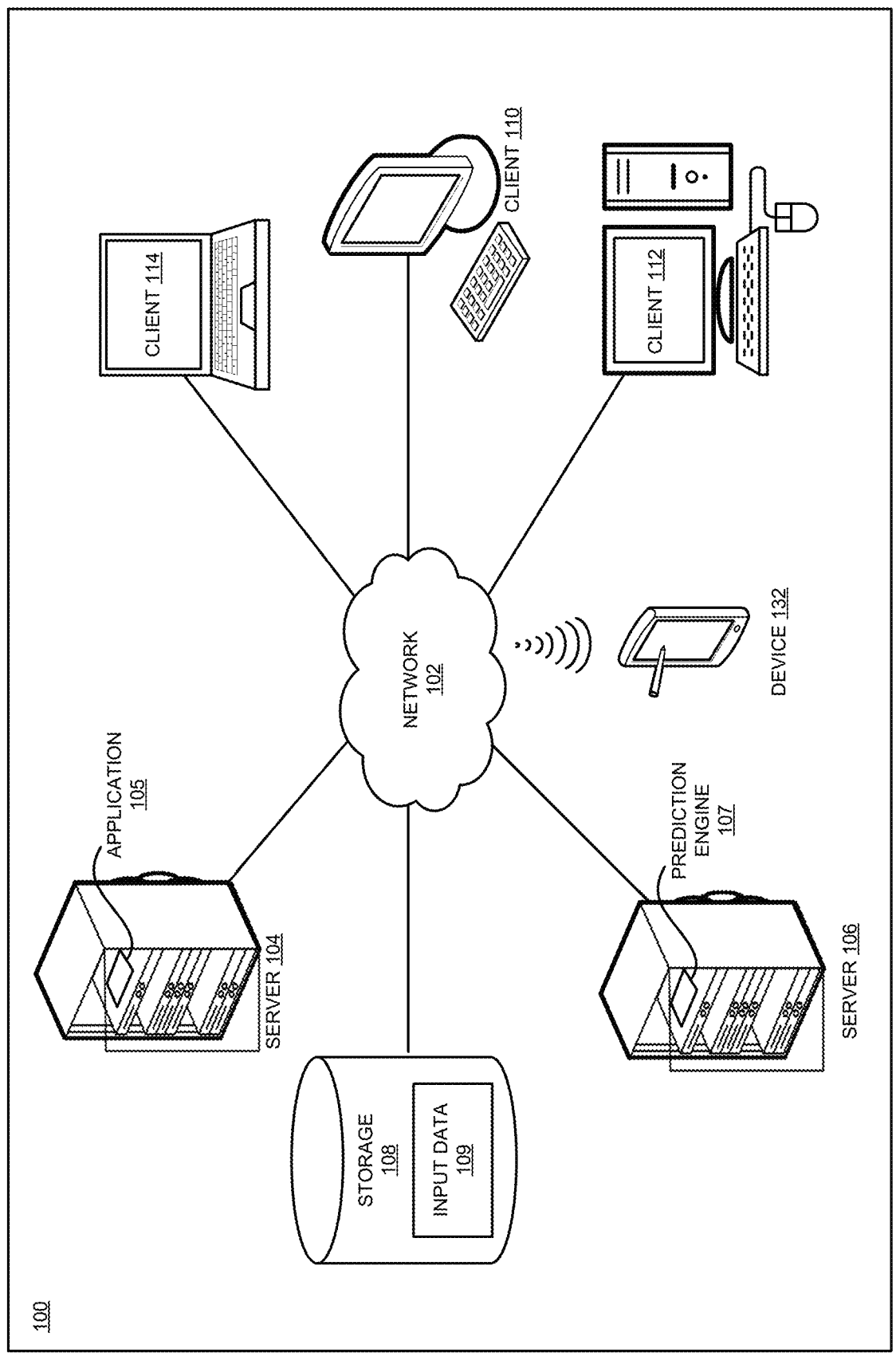
FIG. 1 depicts a block diagram of a network of data processing systems in which illustrative embodiments may be implemented.

Neural network training and optimization is a well-recognized technological field of endeavor. The present state of the technology in this field of endeavor has certain drawbacks and limitations. The operations and/or configurations of the illustrative embodiments impart additional or new capabilities to improve the existing technology in this technological field of endeavor, especially in the area of features selection, feature crossing, and embedding.

A sparse matrix is a matrix in which less than a threshold percentage of cells are non-null, non-void, non-zero, or some other representation of an indicator that the cell is occupied or is to be used. A dense matrix is a matrix in which greater than the threshold percentage of cells are non-null, non-void, non-zero, or some other representation of an indicator that the cell is occupied or is to be used. The illustrative embodiments recognize that having a dense matrix such that the dense matrix is still representative of the data in a sparse dataset, within a defined tolerance of accuracy, is desirable. One way of achieving a dense matrix for a dataset is by selectively crossing certain features, omitting certain features or feature crosses, or both.

The illustrative embodiments recognize that selecting appropriate features to cross to form feature crosses that result in a dense matrix is a difficult problem to solve with practical matrices. Presently available techniques rely on the personal knowledge and expertise of humans who specialize in a subject-matter area to select the features to cross from the datasets pertaining to that subject-matter. Judicious selection of features to cross can result in a dense matrix from a sparse matrix. For example, while an all-inclusive feature crossing effort results in 168 feature crosses in the example traffic dataset, not all 168 feature crosses are really useful for practical purposes. A human skilled in traffic data analysis can selectively determine that Friday at 8 PM tends to be interesting and should form an feature cross, whereas Mondays at 2 PM and Wednesdays at 3 PM appear to be almost similar in the traffic data, so Monday at 2 PM and Wednesday at 3 PM should be crossed together as one feature cross. The human might decide that data for Tuesday at 1 AM is negligible or non-existent and therefore Tuesday at 1 AM should not even be represented in the matrix of feature crosses.

Conversely, crossing too many features or incorrectly related features can lead to data loss, inaccurate prediction, or both. For example, If one were to cross features 12 AM-5 AM for all weekdays Monday-Friday, 6 AM-11 AM for all weekdays Monday-Friday, 12 PM-5 PM for all weekdays Monday-Friday, and 6 PM-11 PM for all weekdays Monday-Friday, a very small and dense matrix with only four feature crosses would indeed result. However, such a matrix will not be able to differentiate between the characteristics of Monday at 7 PM versus Friday at 7 PM, which could be important for analysis and prediction.

Thus, presently, a manual exercise is required with specific skills and knowledge in order to transform a sparse matrix into a useful dense matrix. The illustrative embodiments recognize that an automated method of selecting features to cross, to construct a dense matrix that corresponding to a sparse dataset without unacceptable loss of data granularity or unacceptable loss of accuracy, would be useful. The illustrative embodiments further recognize that such an automated method to iteratively improve the dense matrix with a machine learning method via a feedback from a production implementation of a neural network trained on the dense matrix would also be useful.

According to the illustrative embodiments, embedding is a process of configuring a neural network layer with nodes corresponding to the feature crosses in the dense matrix such that an output of the neural network is within a defined tolerance of accuracy relative to an output of another neural network whose layer is configured according to the feature or feature crosses of the sparse matrix from which the dense matrix is formed. A layer size is a number of nodes in a layer where the nodes in that numerosity are trained corresponding to the feature crosses from the dense matrix. In a general embodiment, the number of nodes in a layer have n:m correspondence with the number of feature crosses in the dense matrix (i.e., n nodes per m feature crosses). In one embodiment, the number of nodes in a layer have 1:1 correspondence with the number of feature crosses in the dense matrix (i.e., one node per feature cross). In another embodiment, the number of nodes in a layer have 1:n correspondence with the number of feature crosses in the dense matrix (i.e., one node per n feature crosses). In another embodiment, the number of nodes in a layer have n:1 correspondence with the number of feature crosses in the dense matrix (i.e., n nodes per feature cross).

The illustrative embodiments recognize that the larger the layer size the higher is the amount of computing and data storage resources for both training as well as operating, as compared to a smaller layer size. At the same time, the larger the layer size, the more accurate is the output of the layer as compared to the output of a layer of a smaller size.

The illustrative embodiments recognize that the feature selections for crossing and the layer size are also interdependent because layer size is dependent on a set of hyperparameters, which include but are not limited to the feature crosses. For example, if a given layer configuration does not produce a desired output or accuracy, a hyperparameter of the neural network has to be adjusted. A feature is a hyperparameter and if an feature cross is changed, the change can cause one or more hyperparameters of the neural network to change. A change in a hyperparameter requires that the neural network be retrained with the new hyperparameters. Training a neural network with thousands of nodes in several layers with matrices that are thousands of columns wide and deep is computationally prohibitively expensive. Therefore, the less the hyperparameters of the neural network are disturbed, the lower the cost of training and deploying the neural network. Thus, again, automated smart selection of features for crossing will be useful.

Furthermore, given a particular dense matrix with a certain density achieved via forming certain feature crosses, a particular embedding produces an output of a certain accuracy. Different embeddings are possible from the same dense matrix by selecting different ways of representing the set or subset of feature crosses from the matrix into the embedding, each producing a different output of a different accuracy. Thus, the illustrative embodiments recognize that there exists a range of embeddings for each subset of feature crosses in which the embeddings produce outputs of acceptable accuracy.

The illustrative embodiments recognize that presently no systematic and objective method exists for selecting an embedding. Generally, humans skilled in the art of neural network training experiment with different embeddings, at great computational cost, to arrive at an embedding that is acceptable. The illustrative embodiments recognize that a systematic and objective computation of an upper bound and a lower bound of embedding for a given dense matrix will be useful.

The illustrative embodiments recognize that the presently available tools or solutions do not address these needs/problems or provide adequate solutions for these needs/problems. The illustrative embodiments used to describe the invention generally address and solve the above-described problems and other related problems by feature engineering in neural networks optimization.

An embodiment can be implemented as a combination of certain hardware components and a software application. An implementation of an embodiment, or one or more components thereof, can be configured as a modification of an existing neural network training and prediction configuration, with a companion software application executing in some combination of (i) the existing neural network training and prediction configuration itself, (ii) a data processing system communicating with the existing neural network training and prediction configuration over short-range radio or a local area network (LAN), and (iii) a data processing system communicating with the existing neural network training and prediction configuration over a wide area network (WAN).

An embodiment forms an ontology from a given dataset. In other words, the embodiment labels vertices with labels (features) and edges with relationships found in the dataset. The embodiment further builds the ontology by populating additional vertices and edges corresponding to derived or inferred labels and relationships. This operation of building the ontology through inferences is called forward materialization.

An embodiment forms a vector space corresponding to the graph of the ontology. A vector space comprises numerical representation of data. The vector space formed by the embodiment includes the numerical representations of the features that are populated in the graph. A vector space produced by an embodiment is usable for determining similarities between concepts present in the vector space. For example, an embodiment applies a similarity function to determine similarities between the concepts underlying the features. A concept is an abstraction or generalized representation of a feature. For example, Monday is a feature and Tuesday is a feature, and they are similar because they are both manifestations of the concept of days of a week even though the dataset may itself not indicate anywhere that Monday and Tuesday are days of a week. Concepts are not limited to this trivial example, and seemingly unrelated features can become linked through esoteric concepts in an embodiment's similarity analysis. Cosine similarity is one non-limiting example of a similarity function that can be used in an embodiment for the purpose of similarity determination in the vector space.

An embodiment constructs a transitive closure data structure corresponding to the vector space. a transitive closure data structure is a data structure that contains information about all the possible paths from reaching point B from point A in the vector space. The transitive closure data structure includes one or more paths between features, inferences, and concepts. An embodiment analyzes a transitive closure data structure to determine and select the most desirable path from a plurality of paths between the two entities represented in the transitive closure data structure. In one embodiment, a path is desirable if the path is the shortest or efficient of all paths in the transitive closure data structure. In other embodiments, a path can also be desirable if the path is the most used path in the transitive closure data structure. Generally, any selection criterion can be used to select one path from a plurality of paths in a transitive closure data structure.

The embodiment removes the unselected paths from a transitive closure data structure. Removal of an unselected path from a transitive closure data structure also removes one or more vertices, edges, or a combination thereof, from the ontology graph. Removal of a vertex or edge from the graph is indicative of a less than a desirable level of contribution of the vertex or edge in the graph. In other words, a removed vertex or edge is deemed to not be contributing to the graph in a meaningful enough way that its removal is unlikely to affect an undesirable (more than a threshold) decrease in an accuracy of prediction with the dataset after the removal.

Thus, an embodiment performs a graph reduction to form a reduced graph such that the reduced graph is still sufficiently representative of the original dataset, but includes features, inferences, and concepts interconnected via the most desirable paths in the graph. This manner of graph reduction is called a transitive reduction. The transitive reduction of an embodiment can be controlled by the extent to which inferences are drawn, parameters of the similarity function to find similarities and concepts, criteria for selecting a desirable path, removal or non-removal of certain undesirable vertices or edges, or some combination thereof.

A remaining vertex in the reduced graph is called a discriminative node because it has the ability to discriminate between data items in the matrix and is not redundant, perfunctory, or superfluous. An embodiment identifies one or more clusters in the remaining vertices in the reduced graph. A cluster identifies features that can be crossed to form useful feature crosses that will not cause an unacceptable level of data loss, loss of accuracy, or both. Each identified feature cross has an upper and lower bounds of cells in the dense matrix. The upper bound is a computation of all positive instances records for each feature that contributes to the cluster irrespective of the transitive reduction cost formula. For example, if in the traffic data example, we did not have any data for Monday at 2 AM, those vertices and edges would fall off during the reduction without any loss of information. Therefore, at the highest bound, the graph is the original graph minus the features that do not contribute to the graph (have no paths through them). In the traffic data example, this might still reduce the graph from the 168 possible feature crosses to, e.g., 142 or some other smaller number. In a more selective embodiment, Monday at 2 AM might have less than a minimal number of data items, or less than a statistical distribution cutoff number of data items and still might get dropped off, in which case, the graph is even smaller but still without significant loss of data or accuracy. Outlier data items and corresponding features can be excluded in this manner.

The lower bound is a function output of all discriminative nodes and their distinct values. Here, because all undesirable paths were eliminated, the elimination may have removed some feature crosses that were meaningful, just not the most meaningful. In other words, the reduction caused the graph to include only the highly discriminating nodes in the vector space, which invariably would cause less discriminating features, feature crosses, and the corresponding data items to be eliminated. In the example traffic dataset, the lower bound could therefore be much lower, e.g., 56 or some smaller number, but with the associated loss of data and/or accuracy.

Thus, an embodiment produces the high and low bounds for the embeddings. An embodiment performs a dimensionality reduction in embedding using the upper and lower bounds of an identified feature cross. For example, one embodiment takes a statistical average of the high and low bounds and comes up with a number that forms the layer size for an embedding.

The manner of feature engineering in neural networks optimization described herein is unavailable in the presently available methods in the technological field of endeavor pertaining to neural network configuration and operation for predictions. A method of an embodiment described herein, when implemented to execute on a device or data processing system, comprises substantial advancement of the functionality of that device or data processing system in systematically and objectively optimizing the dataset to be used for training a neural network, and producing a neural network in which the layer size is optimized to produce predictions of desirable accuracy with significantly reduced computing resources.

The illustrative embodiments are described with respect to certain types of data items, datasets, features, graphs, feature crosses, algorithms, formulae, functions, reductions, neural networks, layers, nodes, relationships, clusters, data structures, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
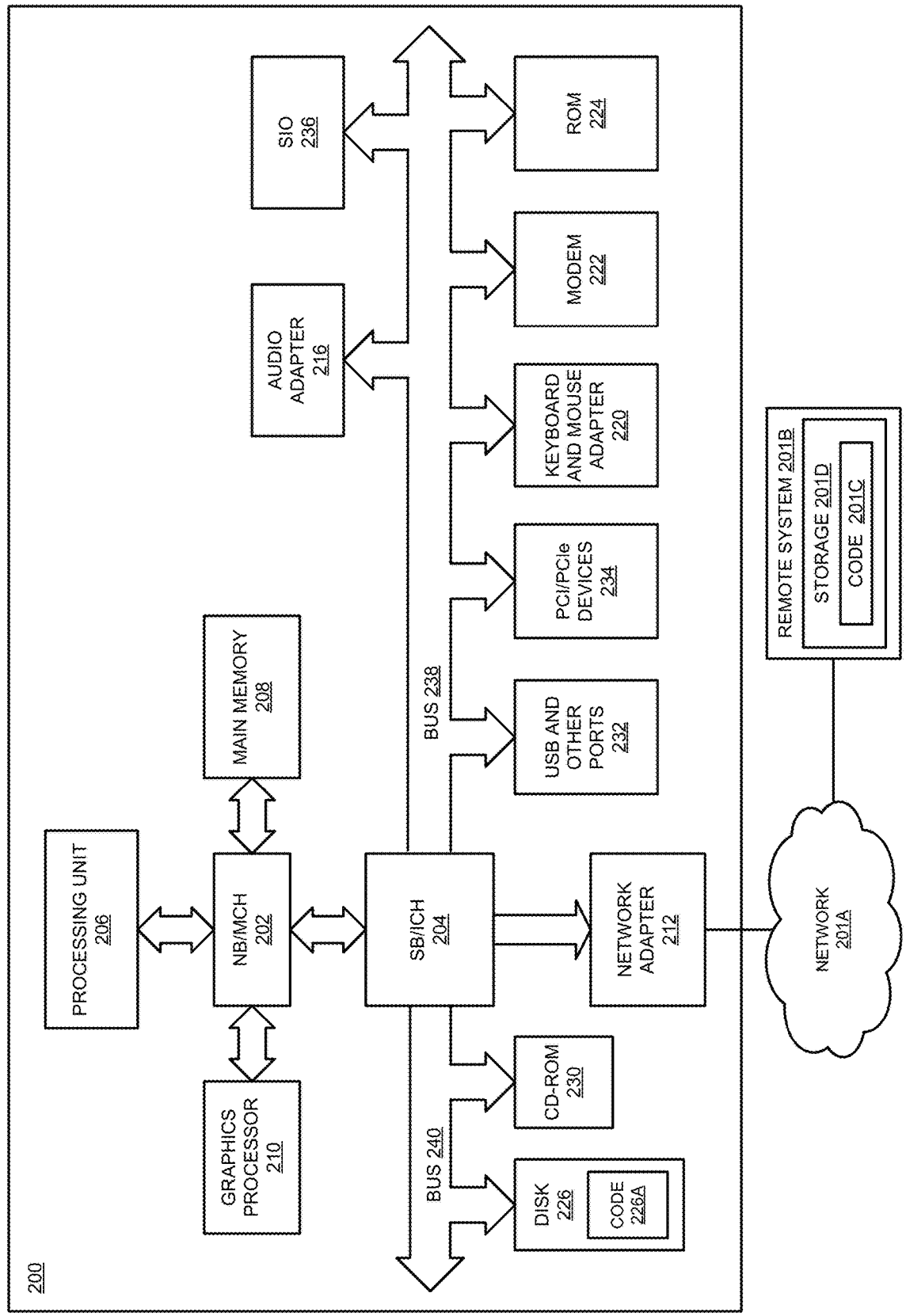
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 implements a remotely usable function (remote) of an embodiment described herein. Application 111 implements a locally usable function (local) or a natively usable function (native) of an embodiment described herein. Application 134 implements a natively usable function (native) of an embodiment described herein. Applications 105 and 111 can be used in a combination, applications 105 and 134 can be used in another combination, and applications 105, 111, and 134 can be used in another combination, to distribute certain functions of an embodiment. Application 105 implements an embodiment described herein. Input data 109 is an example dataset that can be used with an operation of application 105 in a manner described herein. Application 105 uses input data 109 to train a neural network, which can then be operated to make predictions consistent with input data 109, in a manner described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
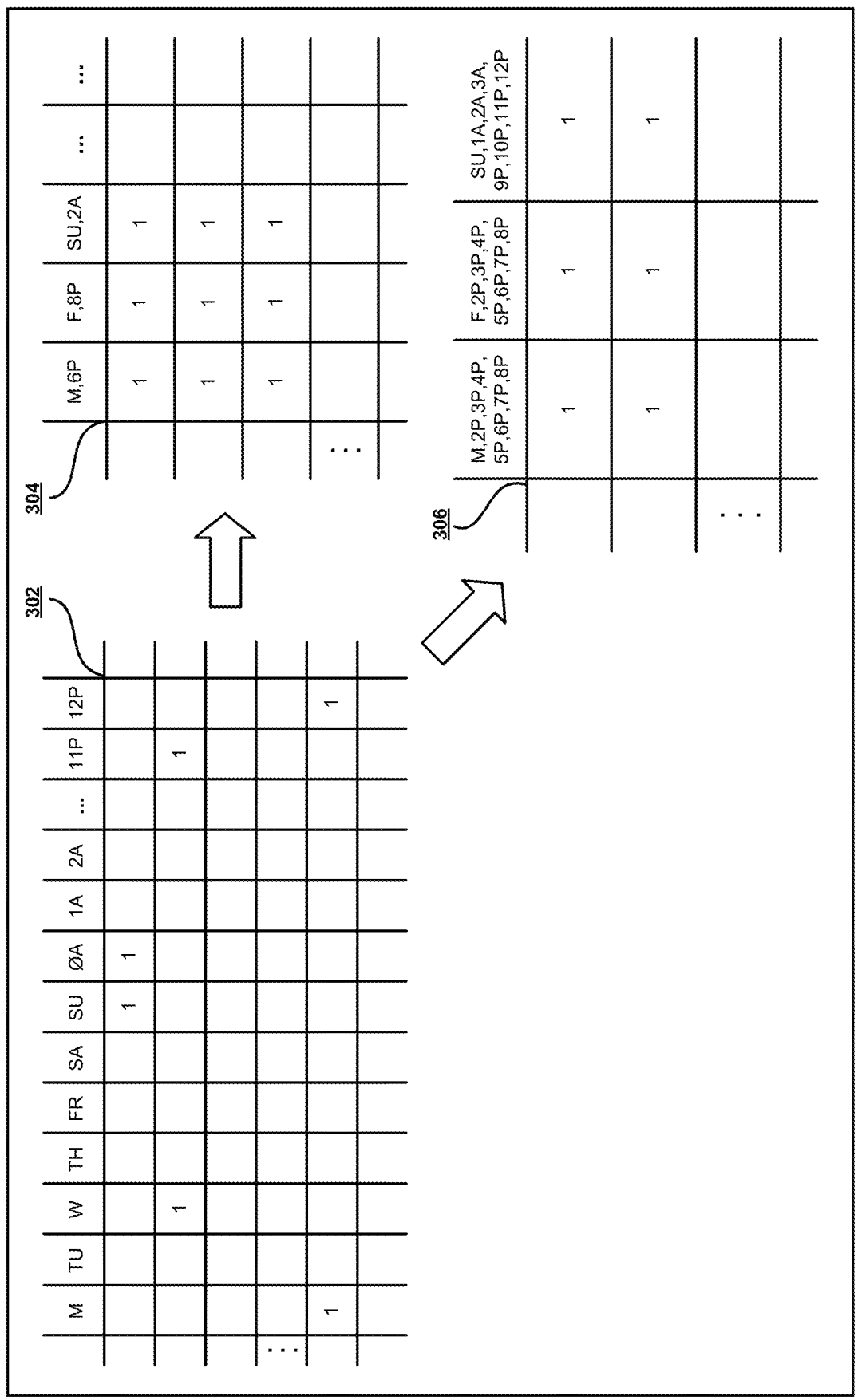
FIG. 3 depicts a block diagram of an example problem that can be solved with an illustrative embodiment.

With reference to FIG. 3, this figure depicts a block diagram of an example problem that can be solved with an illustrative embodiment. Matrix 302 is an example of input data 109 in FIG. 1.

Suppose that matrix 302 represents the example traffic dataset described herein. As shown, matrix 302 comprises individual features for the 7 days of a week and the 24 hours in a day. As can be seen, matrix 302 is quite sparsely populated. The problem with manual feature crossing is illustrated by matrices 304 and 306. When all hours of a day are crossed with all days of a week, we do get some meaningful crosses but now a larger 168 column-wide matrix results that is even more sparse than matrix 302. Conversely, if we cross too many or unrelated features, as in matrix 306, we can achieve a smaller matrix but its cells are not representative of matrix 302 to a desirable degree.

Figure 4:
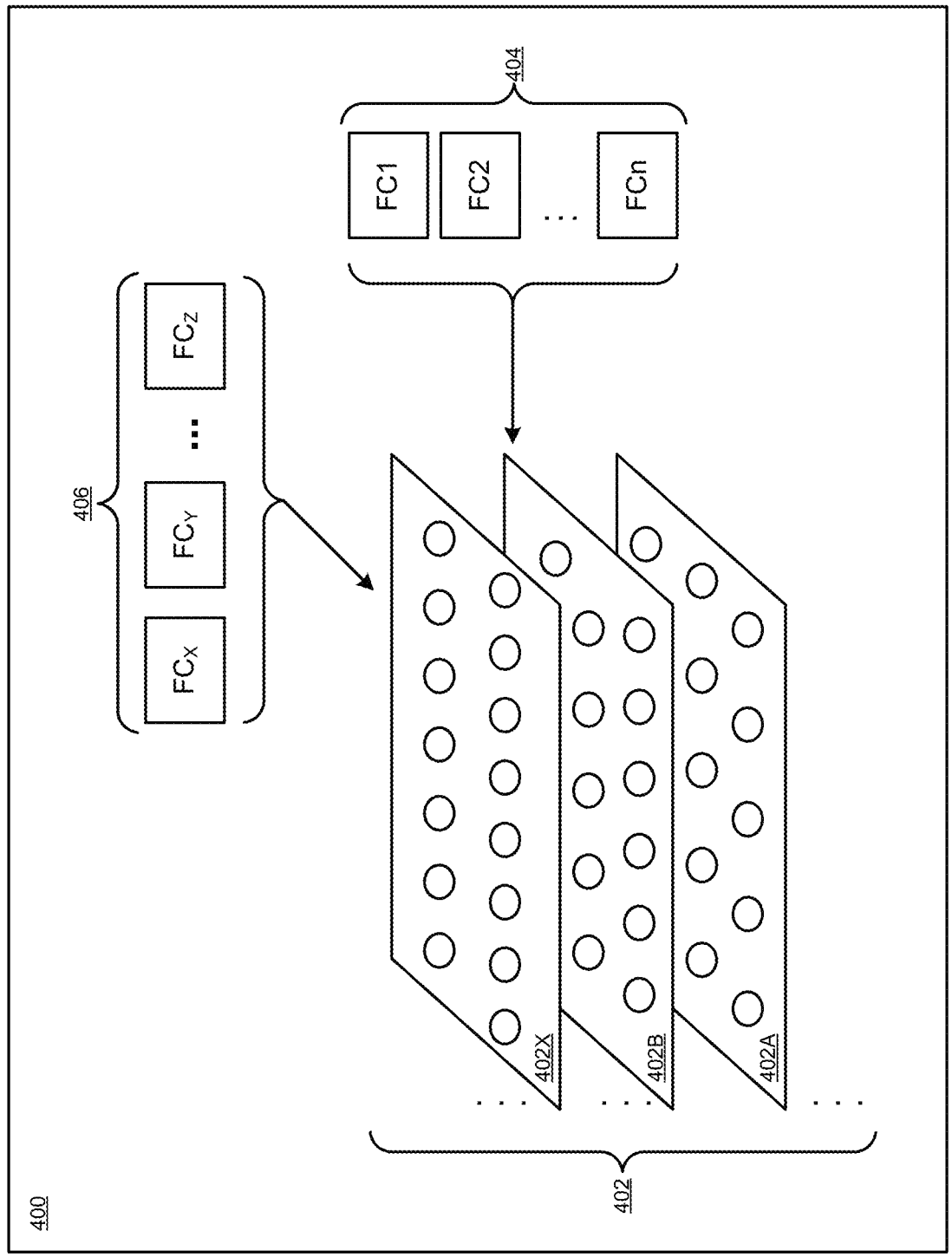
FIG. 4 depicts a block diagram of an example embedding in accordance with an illustrative embodiment.

With reference to FIG. 4, this figure depicts a block diagram of an example embedding in accordance with an illustrative embodiment. Configuration 400 depicts neural network 402 which comprises a number of layers, such as layer 402A, layer 402B . . . layer 402X. feature crosses 404 comprising feature crosses FC1, FC2 . . . FCn are embedded in layer 402B as an example. Any number of layer embeddings can be formed using feature crosses in this manner. For example, feature crosses 406 are similarly embedded in layer 402X in a manner described herein.

Figure 5:
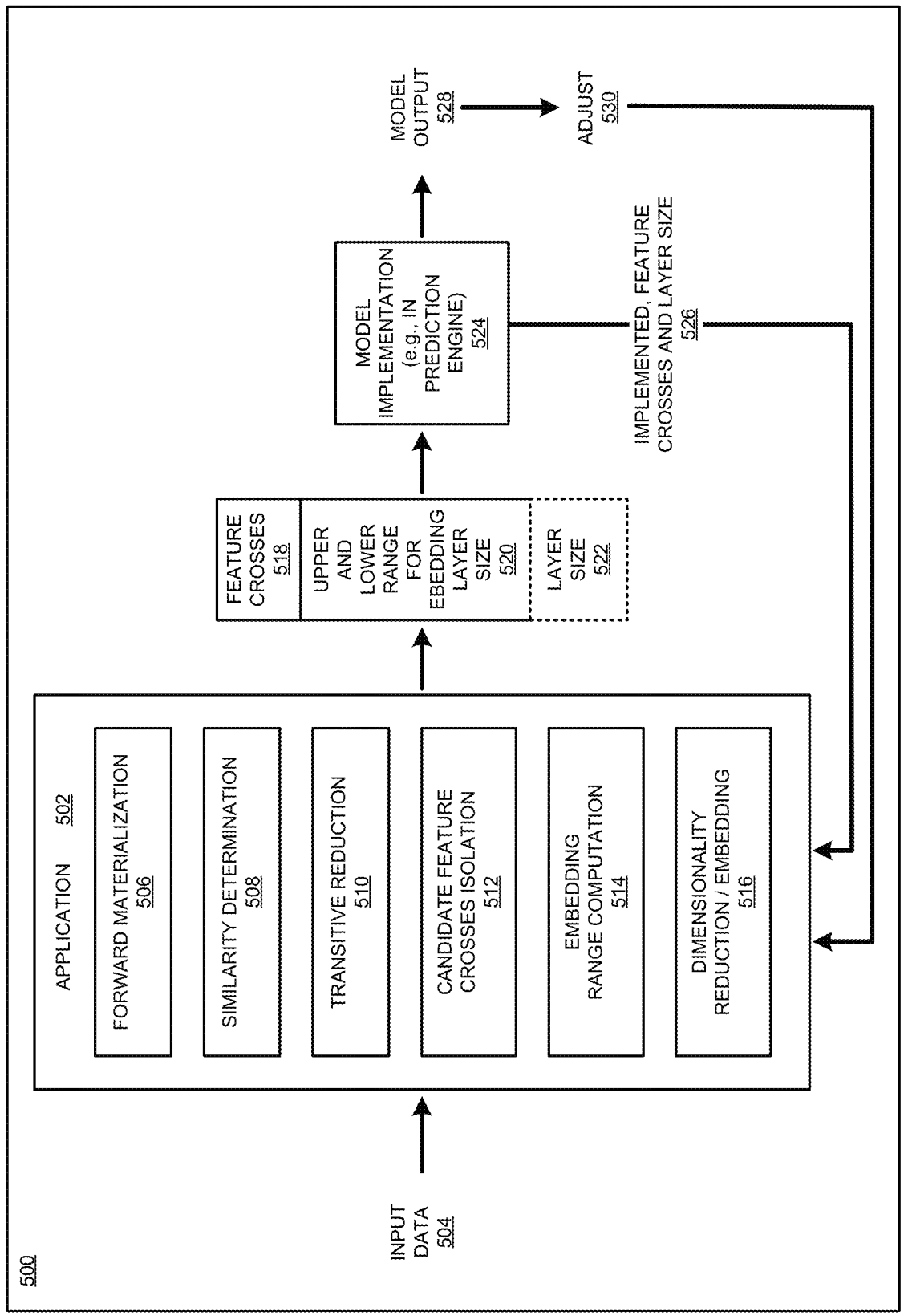
FIG. 5 depicts a block diagram of an example application for feature engineering in neural networks optimization in accordance with an illustrative embodiment.

With reference to FIG. 5, this figure depicts a block diagram of an example application for feature engineering in neural networks optimization in accordance with an illustrative embodiment. Application 502 can be implemented as application 105 in FIG. 1.

Application 502 receives input data 504, which may be in the form of input data 109 in FIG. 1 or matrix 302 in FIG. 3. Component 506 forms an ontology with forward materialization in a manner described herein. Component 508 constructs the vector space corresponding to the ontology and performs a similarity search in a manner described herein. Component 510 transitively reduces the graph using the transitive closure data structures formed from the ontology graph.

Component 512 identifies clusters of discriminative nodes (features) remaining in the reduced graph. The clusters of discriminative nodes extracted from, or isolated in, the reduced graph form a set of candidate feature crosses. A candidate feature cross is a discriminative feature cross that can represent at least a portion of the original dataset with a desired degree of accuracy.

Component 514 computes an upper bound and a lower bound for a candidate feature cross as described herein. Given the embedding range defined by the upper and lower bounds, component 516 determines a dimensionality—layer size of the embedding—for the specific feature cross. In one embodiment, component 516 reduces, or otherwise changes or alters, the dimensionality of the embedding to set a layer size.

In one embodiment, application 502 outputs set 518 of the candidate feature crosses. In another embodiment, application 502 outputs set 518 of the candidate feature crosses together with upper and lower bonds 520 for each candidate feature cross. In another embodiment, application 502 outputs set 518 of the candidate feature crosses together with (i) upper and lower bonds 520 for each candidate feature cross, (ii) a computed layer size 522, or (iii) both (i) and (ii).

Outputs 518, 520, 522 or some combination thereof are usable to configure a neural network. For example, in one embodiment, application 502 causes a neural network to embed a subset of candidate feature crosses 518 according to layer embedding size 522. According to one embodiment, application 502 further causes the configured neural network to form model implementation 524 in a prediction engine, such as in prediction engine 107. In one embodiment, the configuration, the implementation, or both, are automatic without human intervention. In another embodiment, the configuration, the implementation, or some combination thereof is performed after a human review/adjustment/selection of the one or more outputs.

Once the neural network is configured and implemented, in one embodiment, application 502 receives as feedback 526 information containing the set of implemented feature crosses, which may overlap completely or partially with a subset of candidate feature crosses 518. For example, a user might configure some feature crosses from the candidate feature crosses 518 and some feature crosses from the user's own experience that are not in set 518 of candidate feature crosses.

Model implementation 524 produces model output 528, e.g., a prediction. In one embodiment, application 502 receives output 528 as feedback from model implementation 524 directly. In another embodiment, application 502 receives output 528 after a user has applied adjustment 530 to output 528. Either way, application 502 uses feedback 526 and adjusted or unadjusted output 528 to retrain the neural network using a suitable known machine learning technique.

A detailed description of a specific embodiment implementation for solving a specific example problem are now provided. This description is not intended to be limiting on all embodiments described herein. Those of ordinary skill in the art will be able to adapt the details from this embodiment into other embodiments and such adaptations are contemplated within the scope of the illustrative embodiments.

Given a semantic graph (e.g. an Ontology) we want to query whether eg:A is related through eg:p to eg:D and list the derivation route. A rule set to compute the transitive closure over a given relation can be expressed in an API-agnostic fashion:

Statement is [urn:x-hp:eg/A,urn:x-hp:eg/p,urn:x-hp:eg/D]

Rule rule1 concluded (eg:Aeg:peg:D)<-Fact(eg:Aeg:peg:B)

As a reminder, transitive closure is the method by which, given a directed graph, the system determines if a vertex v is reachable from another vertex u for all vertex pairs (u, v) in the given graph. Reachable means that there is a path from vertex u to v. The reachability matrix is called transitive closure of a graph.

This reachability matrix is a method for computing the cost of inference. A transitive inference of the first-order denotes the materialization of a→c via the explicit notion of a→b→c as having a cost of a single node to traverse. The cost is unchanged if the traversed nodes exist within the same sub-class. If the traversed nodes occur within the context of a grand-parent sub-class, the cost increases by a function of the cosine similarity between the classes.

```
def transitiveClosure(V, graph):

reach = [i[:] for i in graph]

for k in range(V):

for i in range(V):

for j in range(V):

reach[i][j] = reach[i][j] or (reach[i][k] and reach[k][j])

return reach graph = [[1, 1, 0, 1],
         [0, 1, 1, 0],
         [0, 0, 1, 1],
         [0, 0, 0, 1]]

transitiveClosure(graph)
```

Figure 6:
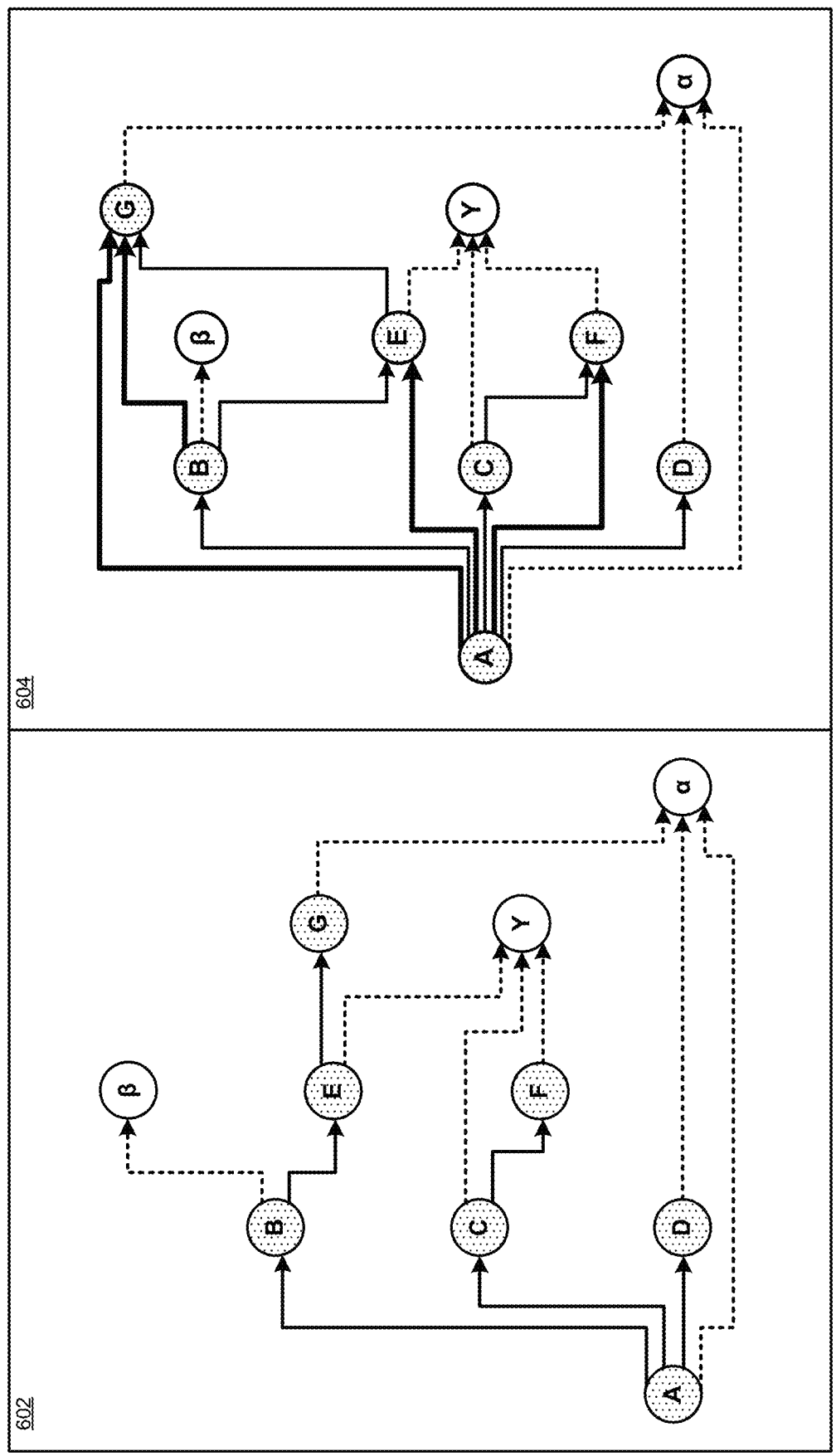
FIG. 6 depicts a materialization of inference in accordance with an illustrative embodiment.

FIG. 6 shows a materialization of inference in accordance with an illustrative embodiment. The materialization of inference is shown in this figure via transitive closure graph 604 (on the right side) against a deep semantic graph 602 (on the left).

In the example, graph 602 demonstrates a semantic graph subset. The hash-patterned nodes are entities in the graph connected via an rdfs:subClassOf or equivalent relationship to the clear-patterned nodes (parents). Graph 604 on the right shows the materialization of inferences. Inference materialization is a form of transitive closure. The darker edges represent a transitive reduction of the semantic graph, meaning that a path is now formed directly from node A to node F (for example). The ability to compute the semantic cost of each transitive reduction materialized within graph 604 is a feature made possible by an illustrative embodiment.

The function takes each materialized entity (λ) across the entire graph multiplied the transitive closure value (x) multiplied by the cosine similarity between parent nodes (cos θ). A non-limiting example cosine similarity algorithm is shown for reference as follows—

$$f(x) = \left\{ \sum_{i=0}^{n} \cos\theta\, \lambda_i x,\ \& x < 0\ x,\ \& x \geq 0 \right.$$

$$\cos\theta = \frac{\vec{a}\cdot\vec{b}}{\|\vec{a}\|\,\|\vec{b}\|} = \frac{\sum_1^n a_i b_i}{\sqrt{\sum_1^n a_i^2}\,\sqrt{\sum_1^n b_i^2}}$$

The output of each function exists within an approximately normal distribution. The z-score is computed by taking the point-value of each entity and subtracting the mean dividing the result by the standard deviation of all values. The decision of how to treat z-scores is somewhat policy-based, but in general, eliminates any statistically significant outlier. The skew of the distribution drives policy in this respect.

Figure 7:
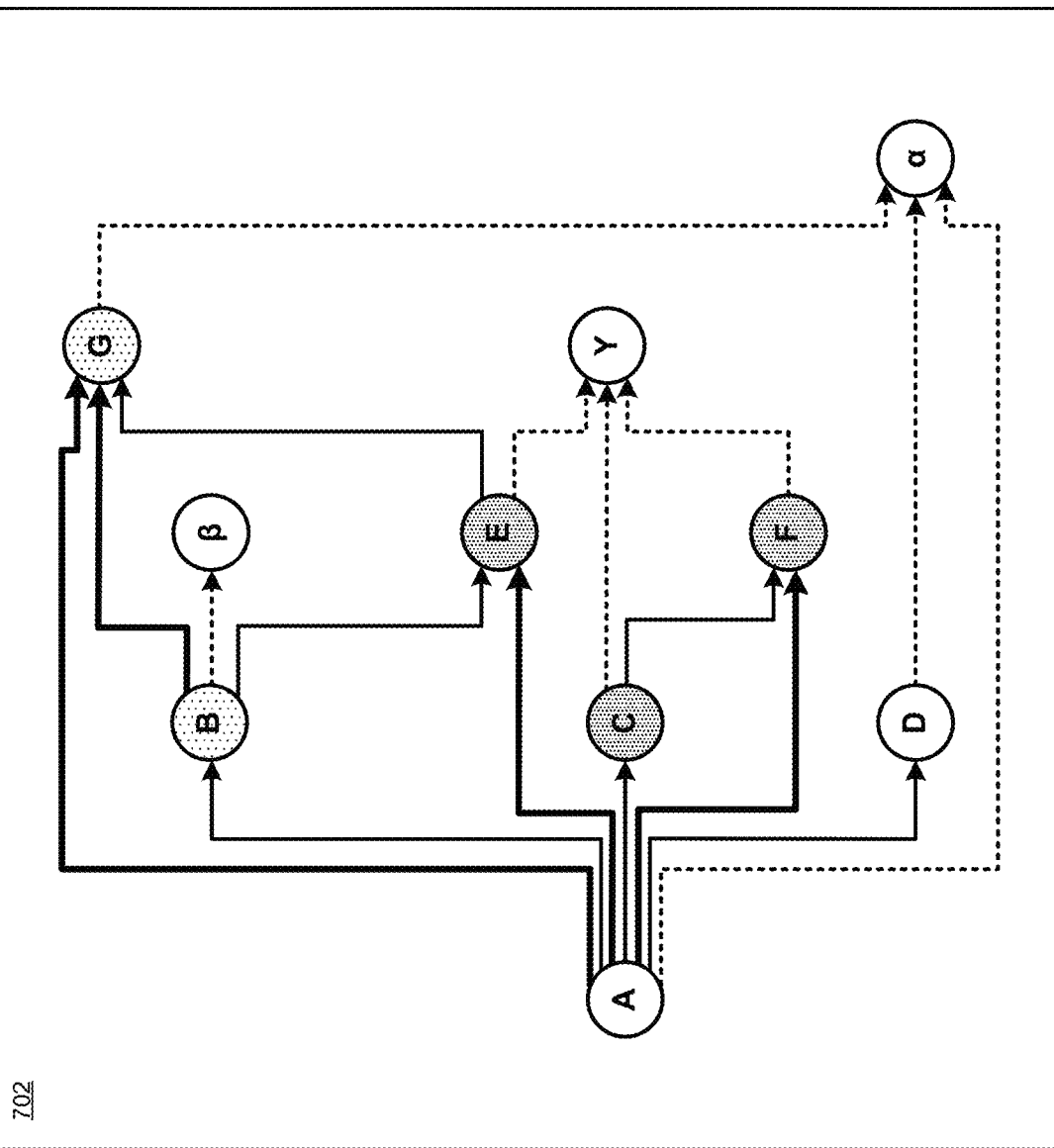
FIG. 7 depicts an output graph resulting from a graph according to an embodiment.

FIG. 7 depicts an output graph resulting from graph 604 in FIG. 6 according to an embodiment. Graph 702 represents the output of the formula on the hypothetical sub-graph 604 in FIG. 6. Entities B, G (shown as line patterned) are concatenated into a single cross-feature. Without the benefit of the above provided formula, existing concatenation strategies would likely include entity E to the detriment of the trained model. The method likewise concatenates entities C, E, F (shown as hash patterned) into a single cross feature. Entity D is left out as the cost computation is too high.

Figure 8A:
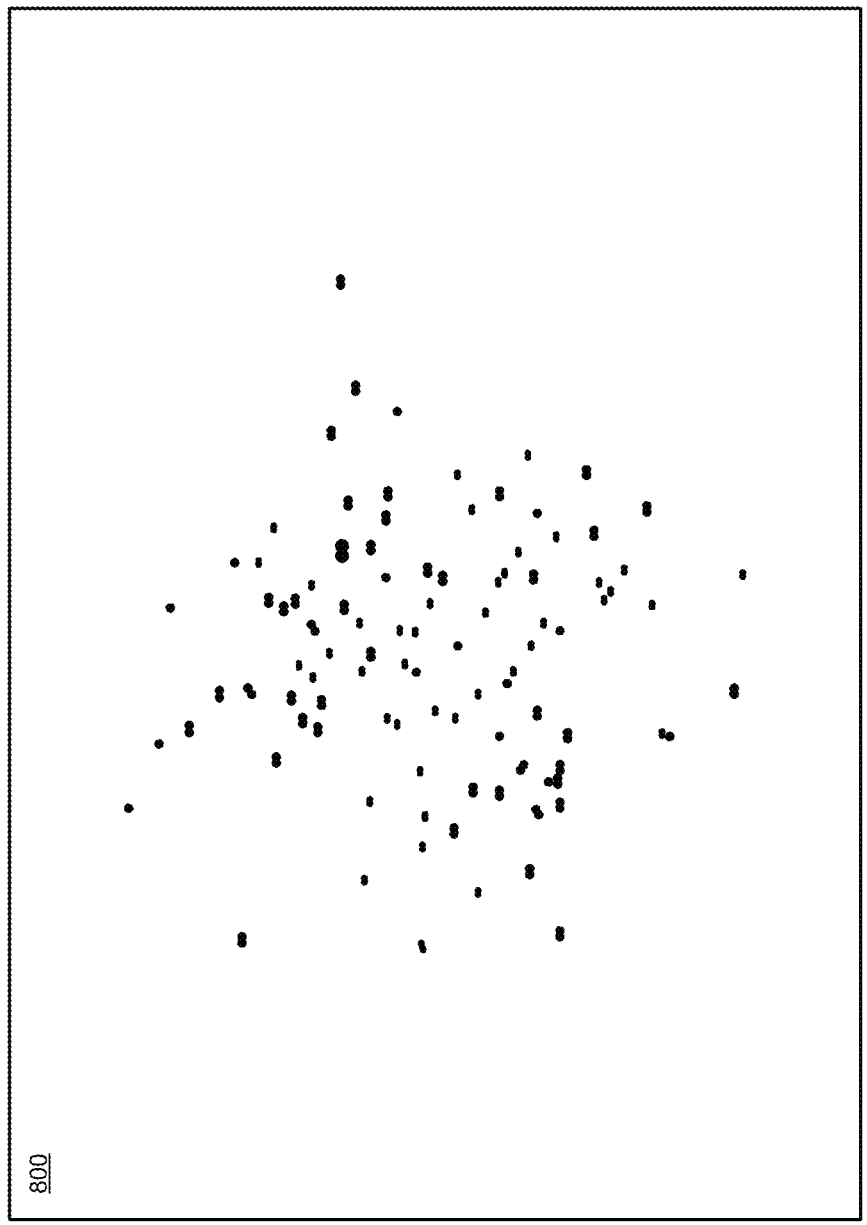
FIG. 8A depicts an placement of an ontology into a vector space.
Figure 8B:
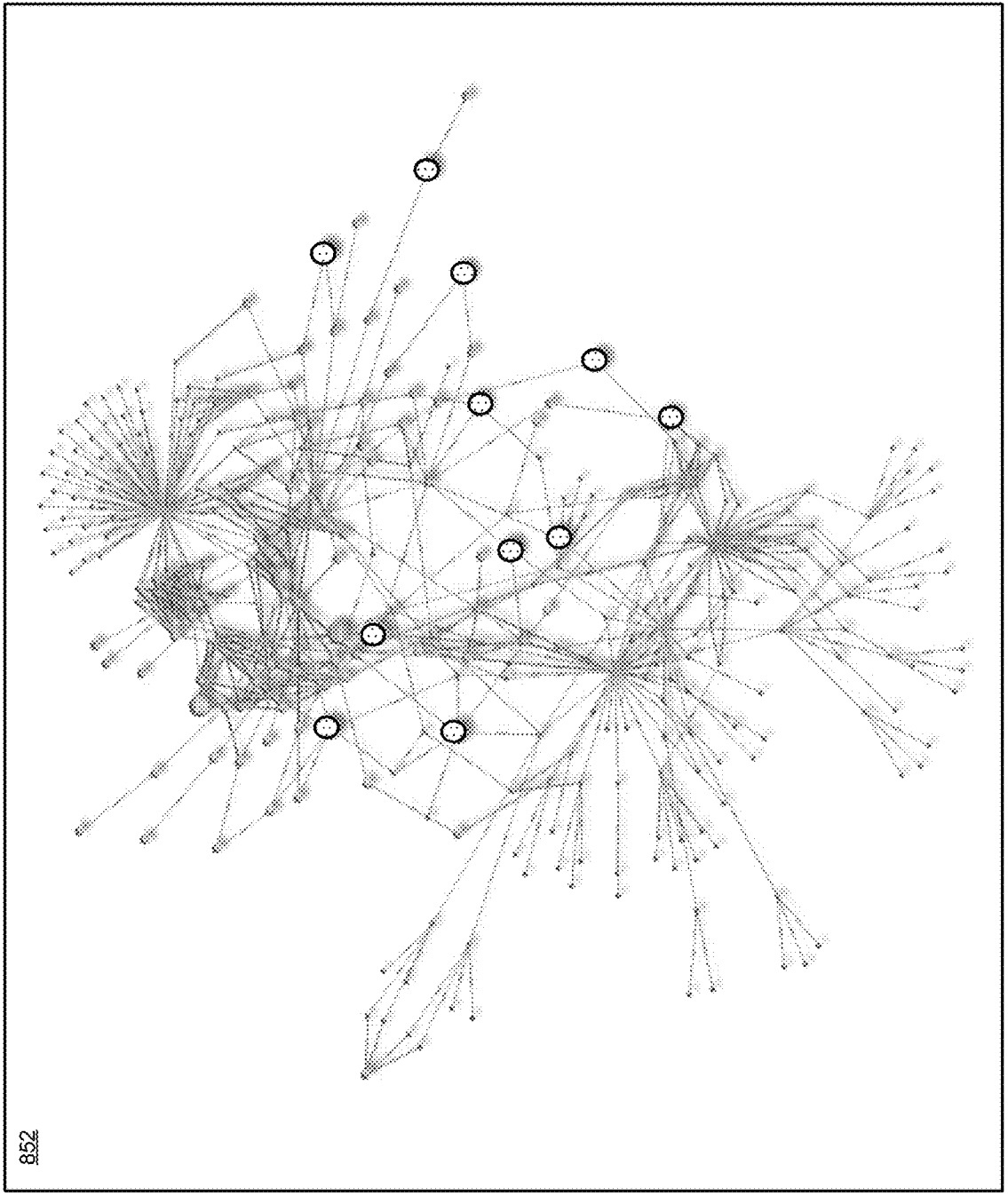
FIG. 8B depicts the materialization of inferences for candidate feature crosses.

Moving on from a hypothetical example to a real-world graph, suppose that a Tensorboard visualization depicts placement of an ontology into a vector space. FIG. 8A depicts an placement of an ontology into a vector space. FIG. 8B depicts the materialization of inferences for candidate feature crosses. An example candidate feature cross is depicted by the line-patterned nodes in graph 852. The line-patterned nodes denote a cluster that has been formed and represent candidate cross-features for a statistical model. The lower-bound of embedding is computed by summing the instance data of all the entities that contribute to each cluster (cross feature) as noted herein.

With reference to FIG. 9, this figure depicts a flowchart of an example process for feature engineering in neural networks optimization in accordance with an illustrative embodiment. Process 900 can be implemented in application 502 in FIG. 5.

The application receives an input dataset (block 902). The application constructs an ontology graph from the dataset (block 904). The application performs forward materialization with inferences on the graph (block 906)

The application constructs a vector space of entities (features) in the forward materialized graph (block 908). The application identifies one or more concepts in the vector space (block 910). The application determines similarities between concepts (block 912).

The application constructs transitive closure data structures for a pair of entities linked by similarities in their concepts (block 914). Using a transitive closure data structure, the application performs a transitive reduction (block 916). The application performs the transitive reduction for one or more transitive closure data structures.

The application identifies clusters of remaining nodes/entities/features in the reduced graph resulting from the transitive reduction operations (block 918). A cluster is a candidate feature cross. The application computes an upper bound for the candidate feature cross (block 920). The application computes a lower bound for the candidate feature cross (block 922). The application computes an embedding layer size for using the upper and lower bounds for the feature cross (block 924).

The application configures a layer in a neural network according to the computed embedding layer size (block 926). Any number of features may be embedded in any number of layers in this manner. The application trains the neural network whose layers are configured in this manner (block 928). The application deploys the trained neural network in a prediction engine (block 930). The application may end process 900 thereafter.

In one implementation, the application further receives feedback from the deployment in the prediction engine (block 932). The application adjusts a feature cross, an embedding layer size, or both, according to the feedback as described herein (block 934). The application ends process 900 thereafter.

Thus, a computer implemented method, system or apparatus, and computer program product are provided in the illustrative embodiments for feature engineering in neural networks optimization and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A method comprising:
constructing, using a processor and a memory, a transitive closure data structure for a pair of features represented in a vector space corresponding to an input dataset, wherein the transitive closure data structure comprises a set of entries corresponding to a set of paths in a graph of the vector space, the set of paths comprising all possible paths in the graph between a first feature in the pair and a second feature in the pair;
reducing the transitive closure data structure by removing from the transitive closure data structure a subset of the set of entries such that only a single entry corresponding to a single path remains in the transitive closure data structure;
forming a feature cross from a cluster of features remaining in a reduced ontology graph resulting from the reducing the transitive closure data structure; and
configuring a layer in a neural network to represent the feature cross, wherein the configured layer in the neural network causes the neural network to produce a prediction that is within a defined accuracy relative to the dataset.

2. The method of claim 1, further comprising:
computing, using the processor and the memory, for the layer, an upper bound of layer embedding corresponding to the feature cross; and
computing, for the layer, a lower bound of the layer embedding corresponding to the feature cross, wherein a layer size of the layer for layer embedding is based on the upper bound and the lower bound.

3. The method of claim 2, wherein the layer size is a computed average of the upper bound and the lower bound.

4. The method of claim 1, further comprising:
transforming the dataset into a sparse matrix;
constructing an ontology graph corresponding to the sparse matrix, wherein the ontology graph comprises a set of vertices corresponding to a set of features in the dataset; and
performing a forward materialization on a graph, wherein the forward materialization adds an inference vertex to the set of vertices, and wherein the set of vertices including the inference vertex is used in constructing the transitive closure data structure.

5. The method of claim 1, wherein the single remaining path satisfies an efficiency requirement.

6. The method of claim 5, wherein the efficiency requirement comprises a shortest distance between the first feature and the second feature.

7. The method of claim 5, wherein the efficiency requirement comprises a highest usage between the first feature and the second feature.

8. The method of claim 1, wherein the reducing comprises a transitive reduction algorithm.

9. The method of claim 1, wherein the reducing the transitive closure data structure causes a subset of vertices to be removed from the ontology graph, forming the reduced ontology graph.

10. The method of claim 1, further comprising:
identifying a plurality of clusters in the reduced ontology graph, the plurality of clusters including the cluster, and wherein the cluster comprises at least two features such that a combination of the two features is usable to distinguish between at least a first portion of the dataset and a second portion of the dataset.

11. A computer usable program product comprising a computer-readable storage device, and program instructions stored on the storage device, the stored program instructions comprising:
program instructions to construct, using a processor and a memory, a transitive closure data structure for a pair of features represented in a vector space corresponding to an input dataset, wherein the transitive closure data structure comprises a set of entries corresponding to a set of paths in a graph of the vector space, the set of paths comprising all possible paths in the graph between a first feature in the pair and a second feature in the pair;
program instructions to reduce the transitive closure data structure by removing from the transitive closure data structure a subset of the set of entries such that only a single entry corresponding to a single path remains in the transitive closure data structure;
program instructions to form a feature cross from a cluster of features remaining in a reduced ontology graph resulting from the reducing the transitive closure data structure; and
program instructions to configure a layer in a neural network to represent the feature cross, wherein the configured layer in the neural network causes the neural network to produce a prediction that is within a defined accuracy relative to the dataset.

12. The computer usable program product of claim 11, further comprising:
program instructions to compute, using the processor and the memory, for the layer, an upper bound of layer embedding corresponding to the feature cross; and
program instructions to compute, for the layer, a lower bound of the layer embedding corresponding to the feature cross, wherein a layer size of the layer for layer embedding is based on the upper bound and the lower bound.

13. The computer usable program product of claim 12, wherein the layer size is a computed average of the upper bound and the lower bound.

14. The computer usable program product of claim 11, further comprising:
program instructions to transform the dataset into a sparse matrix;
program instructions to construct an ontology graph corresponding to the sparse matrix, wherein the ontology graph comprises a set of vertices corresponding to a set of features in the dataset; and
program instructions to perform a forward materialization on a graph, wherein the forward materialization adds an inference vertex to the set of vertices, and wherein the set of vertices including the inference vertex is used in constructing the transitive closure data structure.

15. The computer usable program product of claim 11, wherein the single remaining path satisfies an efficiency requirement.

16. The computer usable program product of claim 15, wherein the efficiency requirement comprises a shortest distance between the first feature and the second feature.

17. The computer usable program product of claim 15, wherein the efficiency requirement comprises a highest usage between the first feature and the second feature.

18. The computer usable program product of claim 11, wherein the stored program instructions are stored in a computer readable storage device in a data processing system, and wherein the stored program instructions are transferred over a network from a remote data processing system.

19. The computer usable program product of claim 11, wherein the stored program instructions are stored in a computer readable storage device in a server data processing system, and wherein the stored program instructions are downloaded over a network to a remote data processing system for use in a computer readable storage device associated with the remote data processing system, further comprising:
program instructions to meter use of the computer usable code associated with the request; and
program instructions to generate an invoice based on the metered use.

20. A computer system comprising a processor, a computer-readable memory, and a computer-readable storage device, and program instructions stored on the storage device for execution by the processor via the memory, the stored program instructions comprising:
program instructions to construct, using a processor and a memory, a transitive closure data structure for a pair of features represented in a vector space corresponding to an input dataset, wherein the transitive closure data structure comprises a set of entries corresponding to a set of paths in a graph of the vector space, the set of paths comprising all possible paths in the graph between a first feature in the pair and a second feature in the pair;
program instructions to reduce the transitive closure data structure by removing from the transitive closure data structure a subset of the set of entries such that only a single entry corresponding to a single path remains in the transitive closure data structure;
program instructions to form a feature cross from a cluster of features remaining in a reduced ontology graph resulting from the reducing the transitive closure data structure; and
program instructions to configure a layer in a neural network to represent the feature cross, wherein the configured layer in the neural network causes the neural network to produce a prediction that is within a defined accuracy relative to the dataset.

* * * * *